United States Patent
Khorram et al.

(10) Patent No.: US 7,266,163 B2
(45) Date of Patent: Sep. 4, 2007

(54) FSK DEMODULATOR SLICER WITH FAST AUTOMATIC DC OFFSET COMPENSATION

(75) Inventors: Shahla Khorram, Los Angeles, CA (US); Brima B. Ibrahim, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 775 days.

(21) Appl. No.: 10/397,704

(22) Filed: Mar. 26, 2003

(65) Prior Publication Data
US 2004/0190650 A1    Sep. 30, 2004

(51) Int. Cl.
*H03D 3/00*    (2006.01)
(52) U.S. Cl. ........................ 375/334; 329/300
(58) Field of Classification Search ................ 375/334, 375/272; 329/300
See application file for complete search history.

(56) References Cited

U.S. PATENT DOCUMENTS 4,270,208 A * 5/1981 MacDavid ................. 375/317

FOREIGN PATENT DOCUMENTS

EP    1148682 A2 *  10/2001

\* cited by examiner

*Primary Examiner*—Temesghen Ghebretinsae
*Assistant Examiner*—Juan Alberto Torres
(74) *Attorney, Agent, or Firm*—Garlick Harrison & Markison; James A. Harrison

(57) ABSTRACT

A data slicer for an FSK demodulator employs a peak and valley detector, each of which has a discharge path with selectable decay rates. The faster decay rate for the peak and valley detector outputs is selected when the difference between the current peak and valley voltages exceeds a predetermined percentage of the expected swing of the voltage input and when a packet has not been detected. When a packet is detected, a slower decay rate is selected. In this mode, the faster decay rate permits faster acquisition of packet data in the presence of DC offset, as it permits the data slicer to converge on an appropriate switching point more quickly.

22 Claims, 9 Drawing Sheets

US 7,266,163 B2

FSK DEMODULATOR SLICER WITH FAST AUTOMATIC DC OFFSET COMPENSATION

BACKGROUND OF THE INVENTION

1. Field of the Invention

This invention relates to the field of wireless communications, and more particularly to the determination of decision thresholds for FSK demodulators.

2. Description of the Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter of a transceiver includes a data modulation stage, one or more intermediate frequency (IF) stages, and a power amplifier. The data modulation stage converts raw data into baseband signals in accordance with a particular wireless communication standard. The one or more IF stages mix the baseband signals with the signal generated by one or more local oscillators to produce RF signals. The power amplifier amplifies the RF signals prior to transmission via an antenna.

As is also known, the receiver is coupled to the antenna and includes a low noise amplifier, one or more IF stages, a filtering stage, and a data recovery stage. The low noise amplifier receives inbound RF signals via the antenna and amplifies them. The one or more IF stages mix the amplified RF signals with one or more local oscillations to convert the amplified RF signals into baseband signals or IF signals. The filtering stage filters the baseband signals or the IF signals to attenuate unwanted out of band signals to produce filtered signals. The data recovery stage recovers raw data from the filtered signals in accordance with the particular wireless communication standard.

One of the modulation/demodulation techniques employed by such wireless communication standards is known as FSK (frequency shift-key) modulation. For FSK modulation, the modulation stage of the transceiver modulates binary information onto an analog carrier signal having a frequency $f_C$. The carrier signal is increased in frequency to a signal $f_1=f_C+f_A$, which represents one of the binary values (e.g., a binary 1) and is decreased in frequency to a second frequency $f_0=f_C-f_A$ which represents the opposite binary state (e.g., a binary zero). FIGS. 1 and 2 illustrate this concept. Carrier signal 100 is modulated such that an increase in frequency is a binary 1 and a decrease in frequency is a binary 0, as shown. The digital information, which is often grouped together for transmission as packets of the digital data, is serially converted by the transceiver's modulation stage into the FSK modulated analog signal, and then transmitted, or broadcasted, to one or more other transceivers in the network.

The receiving transceiver(s) typically includes a discriminator as part of the demodulation stage that is capable of detecting (or discriminating between) the two frequencies as the signal is received, and producing an output voltage that is directly related to the frequency of the received signal. This is sometimes known as a frequency-to-voltage conversion. Typically, all of the transceivers for a network are designed to operate about the predetermined center or carrier frequency of the modulation stages. Thus, the output of the discriminator ideally produces a voltage $V_1=V_C V_A$ for a binary one and a voltage $V_0=V_C+V_A$ for binary zero, where $V_C$ is a voltage representative of $f_C$ and $V_A$ is a voltage that is representative of $f_A$. The output of such a discriminator is illustrated in FIG. 3.

Because the center frequency of each transceiver typically has a tolerance of as much as ±150 kHz of the expected frequency, however, a DC offset voltage is produced during the frequency voltage conversion that is linearly related to the frequency offset. Thus, the value of the output of the voltage-to-frequency converter may be offset by a voltage such that $V_1=V_C+V_A=2V_A$. In such a case, the ideal center point $V_C$ of FIG. 3 will no longer be the ideal comparison or decision point for determining whether the output is representing a binary zero or a one.

One common method of determining the center or slicing point of a discriminator output 102 is through use of a peak and valley detector. FIG. 4 illustrates the imposition of an offset voltage $V_{OFF}$ on discriminator output 102 that forces a peak and valley detector to start at an extreme position. Thus, for the data to be correctly demodulated in light of this potentially time varying offset, the analog-to-digital converter (ADC) that converts the raw output of the frequency to analog converter must be able to dynamically locate an appropriate center point 550 above which is a binary 1, and below which is a binary 0. The peak and valley detector produces an output that quickly attacks (i.e., tracks) the discriminator output in the positive direction and stores a peak value 502 of the voltage for any given point in time. That peak value is then permitted to decay until another positive-going signal of the discriminator output exceeds the decaying value, at which point the greater voltage is stored.

Likewise, the peak and valley detector does the same and produces a decaying peak value 504 from an initial offset value and a decaying peak value 506 from subsequent negative peaks (valleys). The slice point is then along the line 506, and is dynamically determined to be the halfway point of the difference between the current values of the peak and valley detectors (i.e., $V_p-V_v$). The decay rate of the two detectors should be such that they will detect peaks and valleys that are less than the peaks or valleys previously detected (i.e., when the offset changes). As is illustrated by FIG. 4, some, if not all, of the first three bits will go undetected given this decay rate because the slice point along the line 506 does not reach an ideal location for distinguishing between levels until approximately point 508.

On the other hand, one does not want the decay rate too fast, even though that may improve the data acquisition time. If too many of the same bit values are transmitted sequentially, and the decay rate is too fast, the detector output that is decaying will rapidly approach the other detector's value until they are virtually equal. FIG. 5 illustrates this scenario. Line 404 illustrates the decay of the valley detector as it spans several binary ones in the signal. As can be seen from FIG. 5, if the same bit state is present long enough, the decay of the valley detector will eventually bring it very close to the value of the positive voltage swing at $V_1=V_C+V_A$. If this occurs, it will be clear to those of average skill in the art that this reduces the noise margin so severely for the ADC that even the slightest bit of noise will cause the ADC to toggle based on noise present in discriminator output 102. This in turn increases the Bit Error Rate of the channel significantly.

Prior art solutions have typically constrained the decay rate based on the known maximum number of the same bits that will be received in a row, and to ensure that if such a transmission is received, the slicing point is always within a range that provides ample noise margin until the next bit toggle comes along. This solution has heretofore been a reasonably acceptable one because applications of FSK have been primarily for lower rate transmission standards, or ones that have sufficiently long headers that provide ample time to capture the signal, even when the peak detectors have somewhat slow decay rates.

One example of a specific wireless network standard is one based on the Bluetooth standard, which is designed to facilitate short-range (i.e., 30 to 60 feet) wireless communication between terminal equipment, such as PC's, laptops, printers, faxes, and hand-held devices, such as PDAs (personal digital assistants). The Bluetooth standard defines a standard by which devices, such as the foregoing, transmit and receive signals using the ISM (industrial, scientific and medical) radio band of 2.4 GHz. This standard has been established to promote the networking of such devices through compatible transceivers so that they may communicate with one another without need for physical interconnection through proprietary cables. The noise and signal strength issues for a Bluetooth wireless network are analogous to the cellular telephone network, albeit over much shorter distances.

One of the characteristics of Bluetooth is its relatively high transmission frequency of 2.4 GHz and its extremely short preamble. The preamble is typically only 4 bits toggling between 0 and 1. Thus, in view of a large offset embedded within an incoming transmission, such as that illustrated in FIG. 4, a peak or valley detector designed to slowly take so long to decay that the peaks or valleys of several bits beyond the preamble could be missed. If the decay rate is too fast, there may be situations where the peak and valley outputs become too close to another to provide an appropriate slicing point.

Therefore, there is a need in the art for an FSK slice point determination method and apparatus to permit fast acquisition of packet preamble information, while ensuring that noise margin for the ADC is maintained thereby keeping the Bit Error Rate for the system low.

BRIEF SUMMARY OF THE INVENTION

An embodiment of a Radio Frequency (RF) receiver of a wireless device has an amplifier for amplifying a received FSK modulated RF signal, which is coupled to a down-converter for converting the received FSK modulated signal to a down-converted IF or baseband frequency. The down-converted FSK modulated signal is in turn fed into an FSK demodulator that has a discriminator, a slicing circuit and a comparator. The discriminator performs a frequency-to-voltage conversion to convert the FSK modulated signal into a voltage signal, the magnitude of which is directly related to the frequency of the FSK modulated signal. The modulator also has a data slicer that dynamically determines from the voltage signal the optimum slicing point (i.e., the optimum magnitude) with which to delineate between a binary one and zero in the voltage signal. The comparator circuit receives the slice point output and the voltage output from the discriminator and outputs a binary one when the magnitude of the voltage output exceeds the slicing point, and a binary zero when less than the slicing point.

The data slicer is coupled to the discriminator to receive the voltage signal, which is fed into a peak detector and a valley detector. The peak detector produces an output that continuously reflects the magnitude of the most recent peak voltage (currently the greatest positive-going signal) of the voltage signal. The valley detector produces an output that continuously reflects the magnitude of the most recent peak valley voltage (currently the greatest negative-going signal) of the voltage signal. A discharge path is provided for both the peak detector and valley detector outputs such that once the magnitude of the voltage signal falls below the most recent peak level of the positive or negative swing of the voltage signal, the stored peak voltage on both detector outputs is permitted to decay through the discharge path.

The discharge path for each of the two detector outputs has at least two rates of decay, which may be selected using a control signal generated by a decay rate selector circuit. The decay rate selector is coupled to current control devices in the discharge paths of the peak and valley detector outputs. The control output selects a faster decay rate whenever the difference between the magnitudes of the current peak and current valley voltages exceeds some percentage of an expected difference, and a fast decay mode is not disabled. Otherwise, the decay rate selector selects a slower decay rate. In one embodiment, the current control devices are switchable current sources. The fast decay rate is selected by switching the current source into the discharge path having the greater magnitude. An embodiment also might implement a single current source in the discharge path, wherein its magnitude is controlled by the decay rate selector control signal.

The data slicer also includes a summing circuit that sums the magnitudes of the current peak and valley voltages and a scaling amplifier with a gain of about 0.5 that scales the sum by approximately 50% to locate the current slicing point in between the two extremes.

BRIEF DESCRIPTION OF THE SEVERAL VIEWS OF THE DRAWINGS

The FSK slicer method and apparatus of the invention may be better understood, and its numerous objectives, features and advantages made apparent to those skilled in the art by referencing the accompanying drawings. The use of the same reference number throughout the several figures designates a like or similar element.

DETAILED DESCRIPTION OF THE INVENTION

Figure 1:
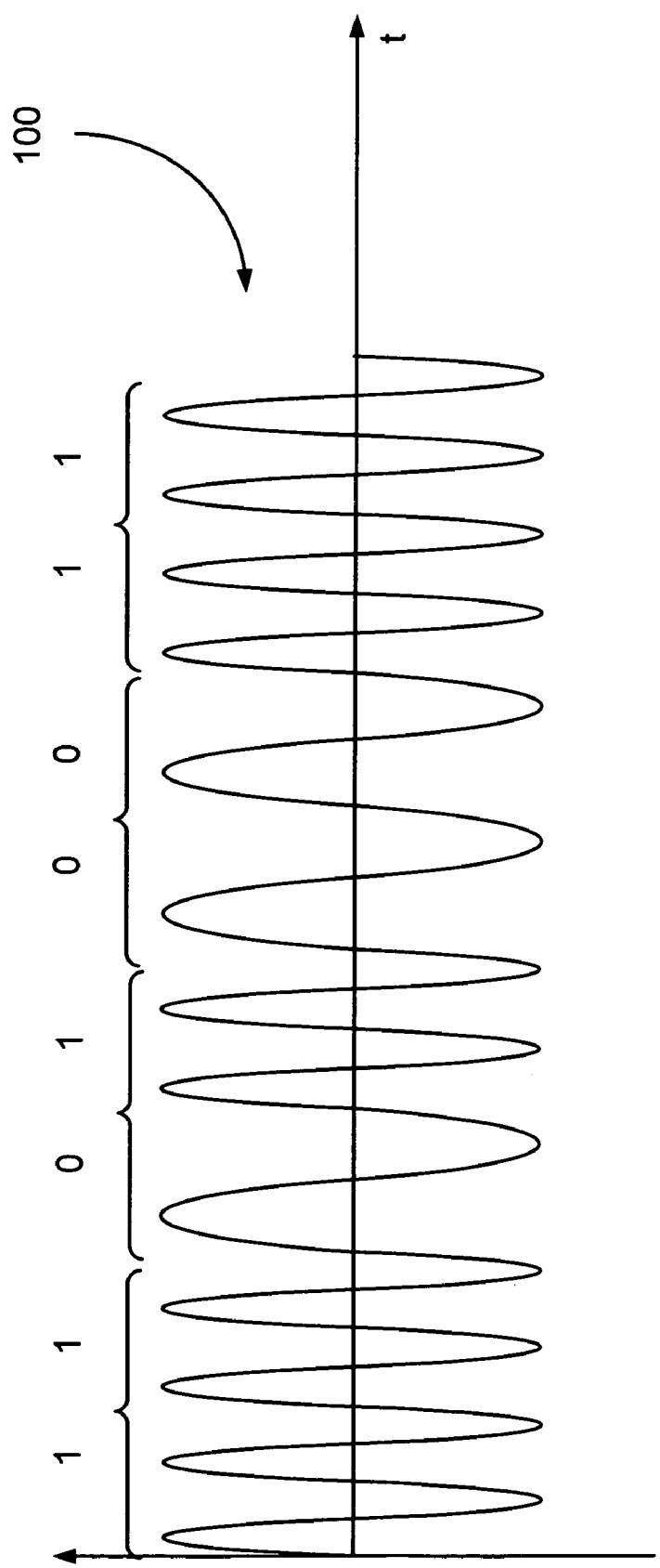
FIG. 1 illustrates a waveform diagram representation of FSK modulation.
Figure 2:
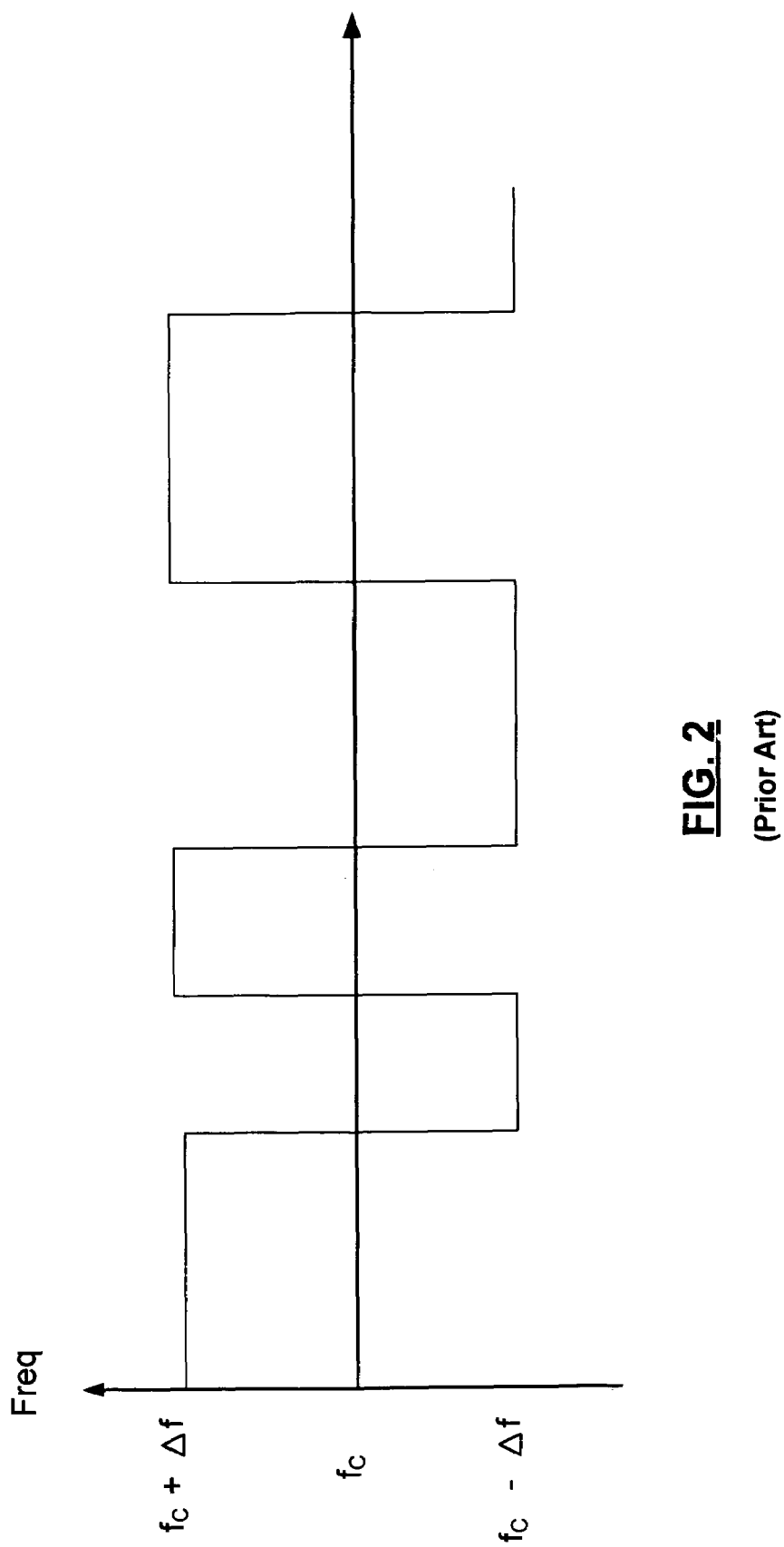
FIG. 2 illustrates a frequency waveform representation of the FSK modulated signal of FIG. 1.
Figure 3:
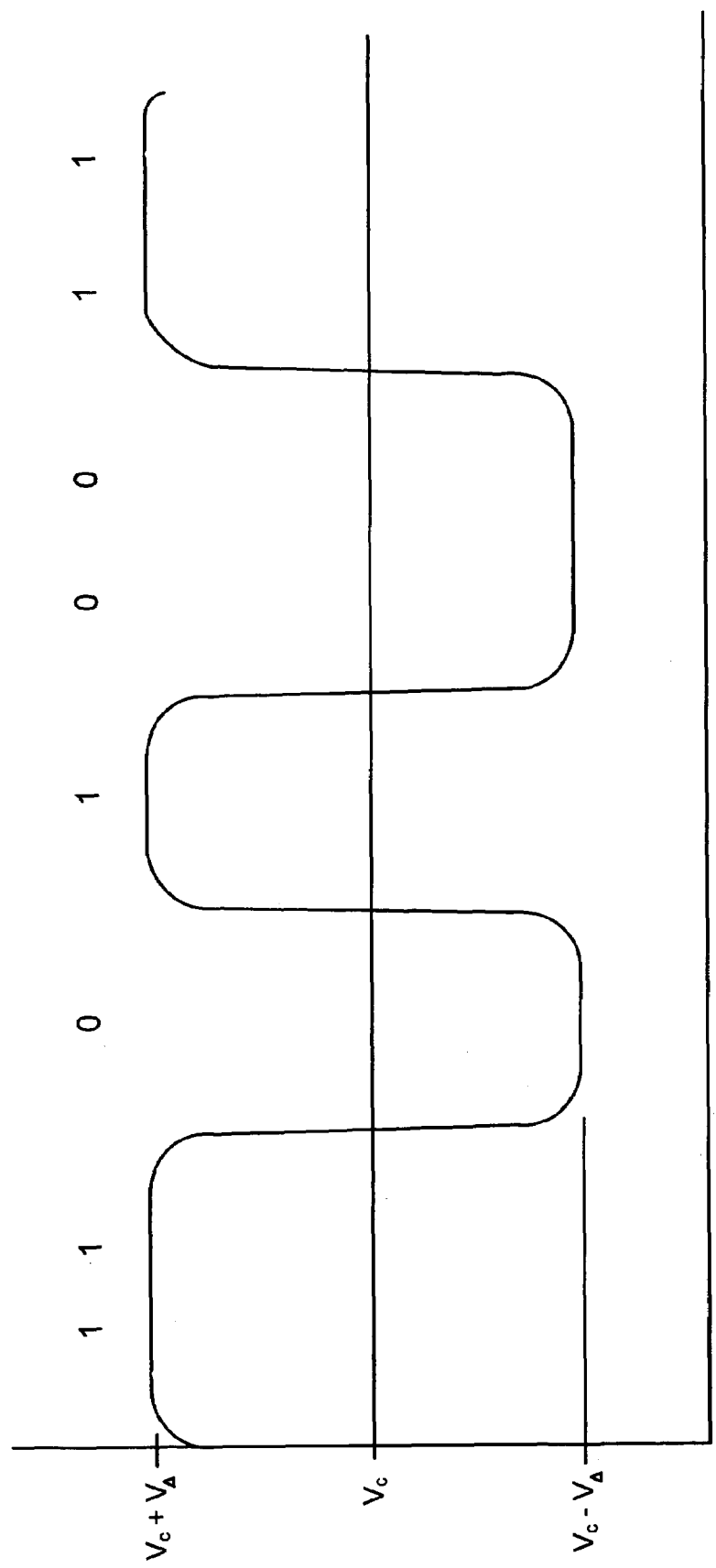
FIG. 3 illustrates frequency-to-voltage conversion of the waveform of FIG. 1.
Figure 4:
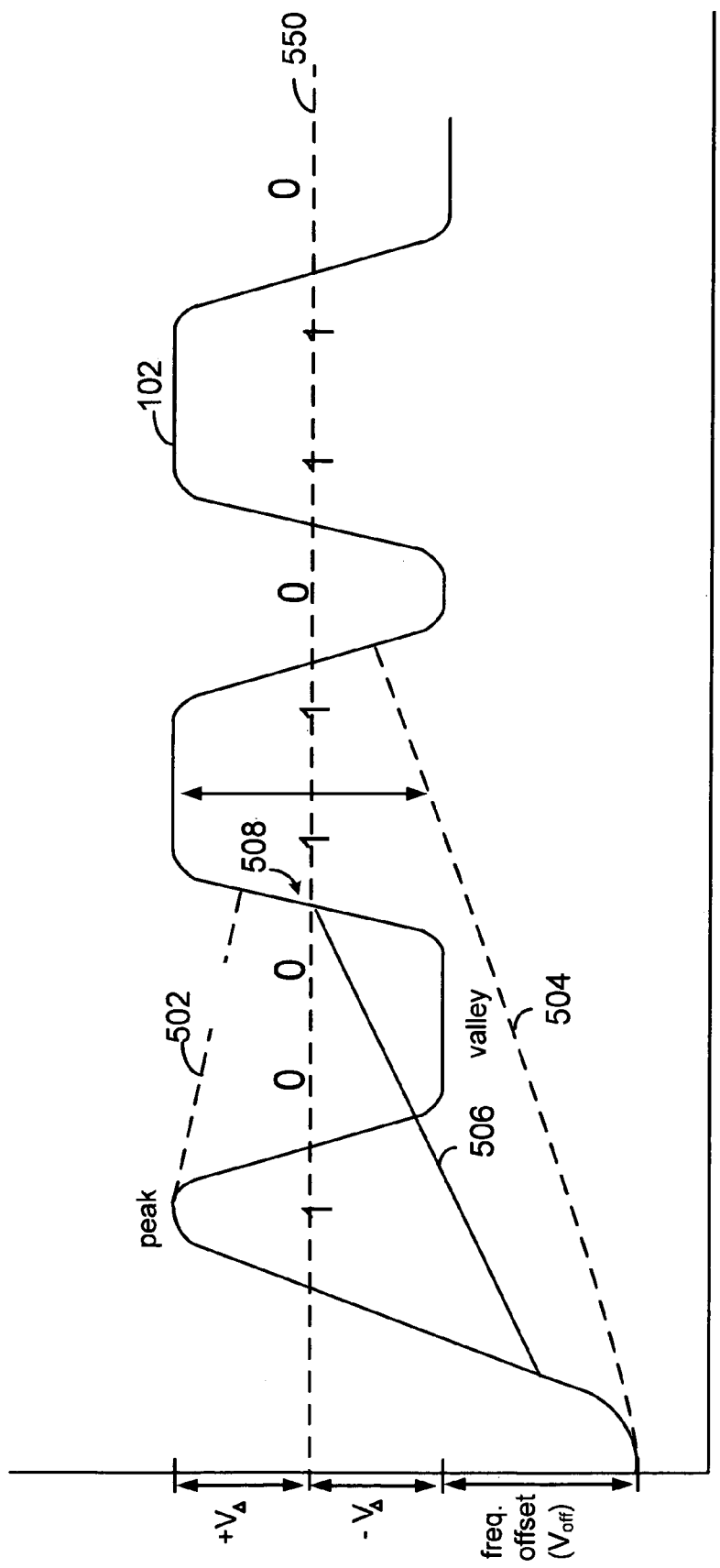
FIG. 4 illustrates the imposition of a frequency offset to an FSK modulated signal and the resulting output from a frequency-to-voltage converter and the use of peak detectors to determine the slicing point dynamically in the presence of the offset.
Figure 5:
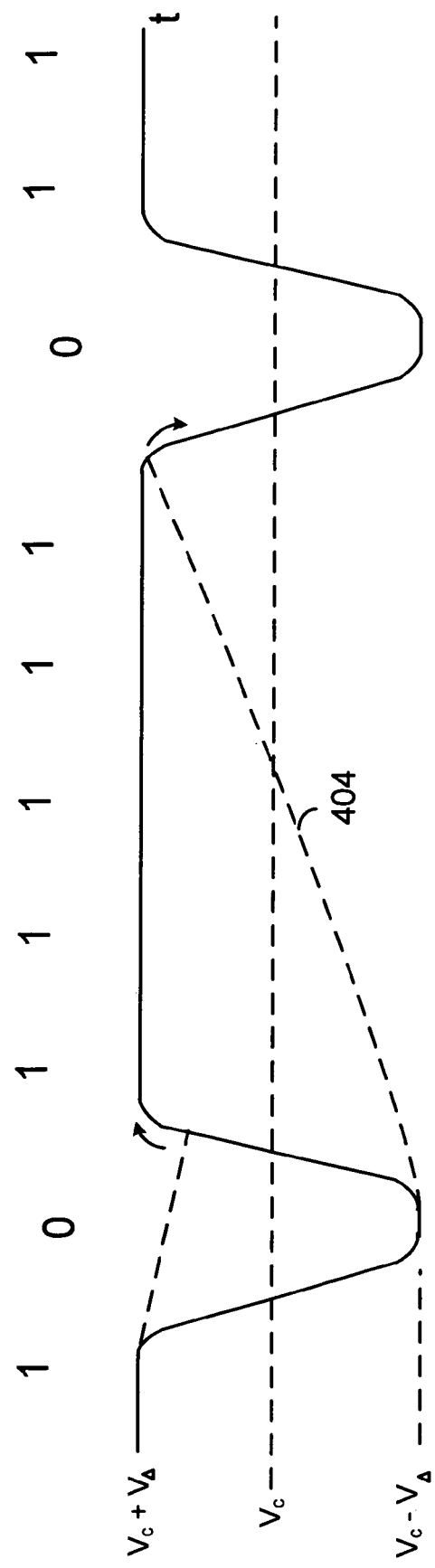
FIG. 5 is an example of the decay rate of the peak detector outputs being too high to support long strings of the same binary value.
Figure 6:
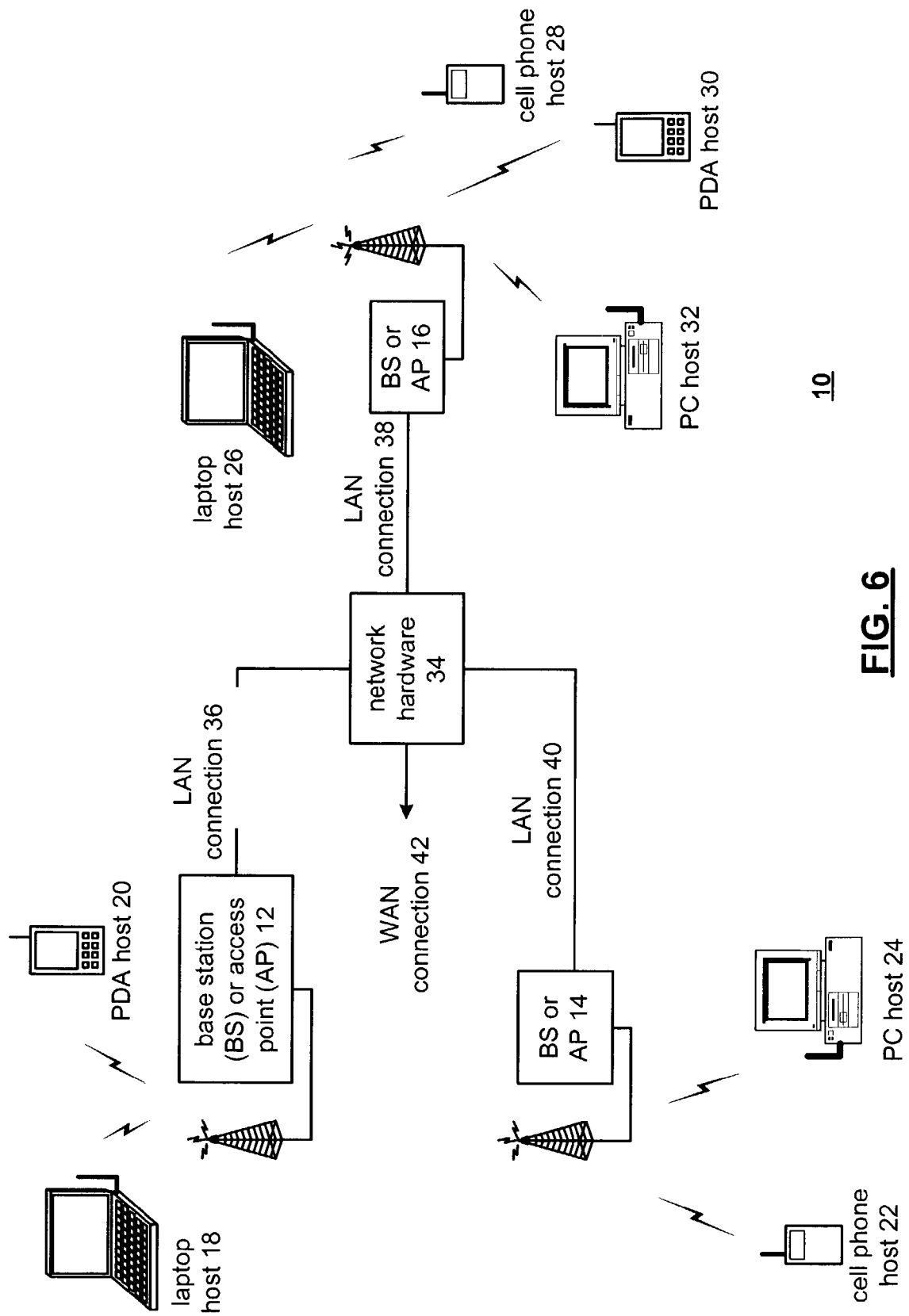
FIG. 6 is a schematic block diagram illustrating a wireless communication system in accordance with the present invention.

FIG. 6 is a schematic block diagram illustrating a communication system 10 that includes a plurality of base stations or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 7.

The base stations or access points 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio transceiver and/or is coupled to a radio transceiver. The radio transceiver includes a highly stable and area efficient channel select filter topology, as disclosed herein, to enhance performance, reduce costs, reduce size, and/or enhance broadband applications.

Figure 7:
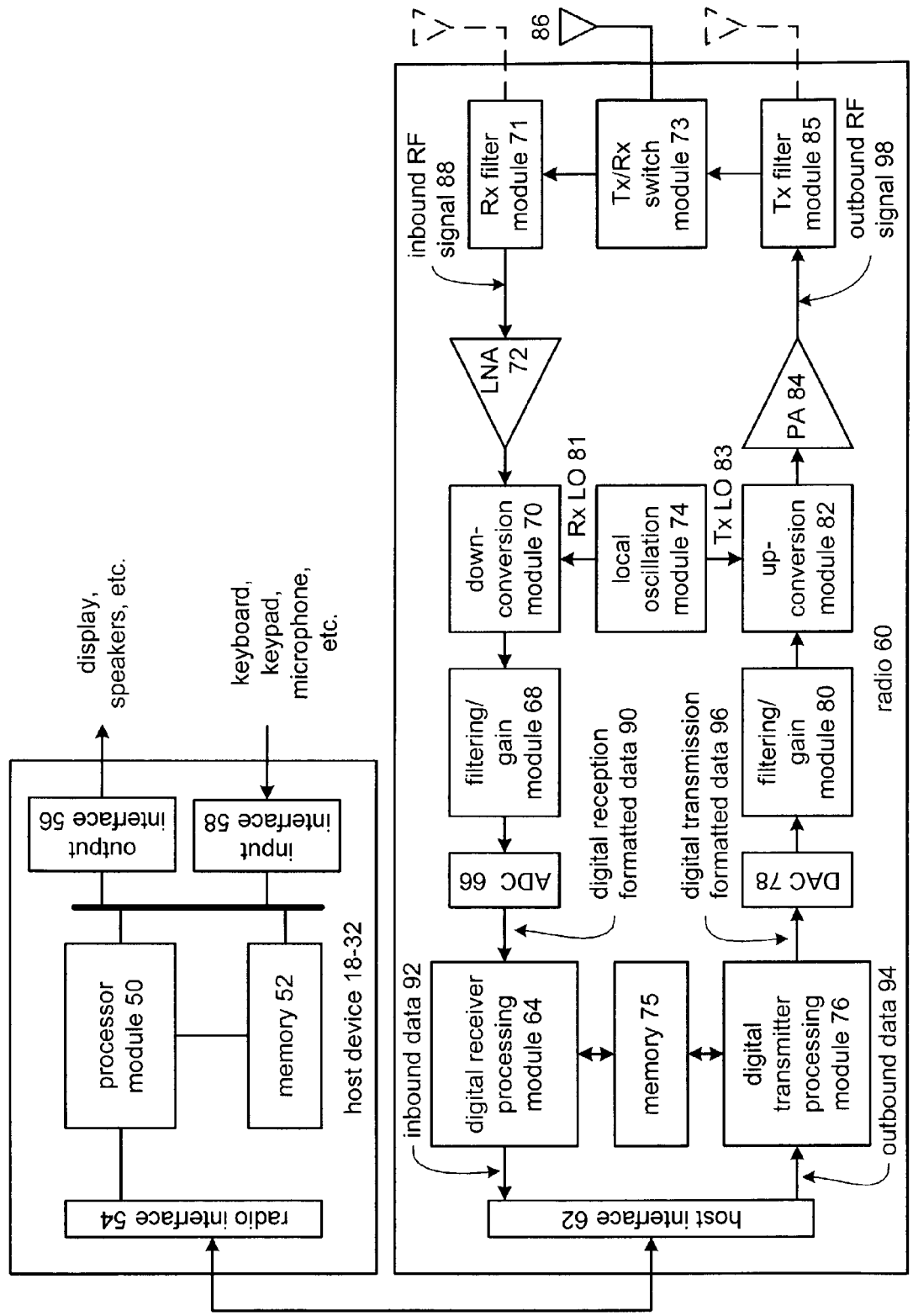
FIG. 7 is a schematic block diagram illustrating a wireless communication device in accordance with the present invention.

FIG. 7 is a schematic block diagram illustrating a wireless communication device that includes the host device 18-32 and an associated radio 60. For cellular telephone hosts, the radio 60 is a built-in component. For personal digital assistant hosts, laptop hosts, and/or personal computer hosts, the radio 60 may be built-in or an externally coupled component.

As illustrated, the host device 18-32 includes a processor module 50, a memory 52, a radio interface 54, an input interface 58 and an output interface 56. The processor module 50 and memory 52 execute the corresponding instructions that are typically performed by the host device. For example, for a cellular telephone host device, the processor module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processor module 50 for further processing and/or routing to the output interface 56. The output interface 56 provides connectivity to an output display device, such as a display, monitor, speakers, etc., such that the received data may be displayed. The radio interface 54 also provides data from the processor module 50 to the radio 60. The processor module 50 may receive the outbound data from an input device such as a keyboard, keypad, microphone, etc., via the input interface 58 or generate the data itself. For data received via the input interface 58, the processor module 50 may perform a corresponding host function on the data and/or route it to the radio 60 via the radio interface 54.

Radio 60 includes a host interface 62, a digital receiver processing module 64, an analog-to-digital converter (ADC) 66, a filtering/gain module 68, an IF mixing down-conversion module 70, a receiver filter module 71, a low noise amplifier 72, a transmitter/receiver switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 may be a single antenna that is shared by the transmit and receive paths as regulated by the Tx/Rx switch module 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital IF to baseband conversion, demodulation, constellation demapping, decoding, and/or descrambling. The digital transmitter functions include, but are not limited to, scrambling, encoding, constellation mapping, modulation, and/or digital baseband to IF conversion.

The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores and the processing modules 64 and/or 76 execute operational instructions corresponding to signal processing functions performed on the received and transmitted signals.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing up-conversion module 82. The IF mixing up-conversion module 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the IF mixing down-conversion module 70, which directly converts the amplified inbound RF signal into an inbound low IF signal or baseband signal based on a receiver local oscillation 81 provided by local oscillation module 74. The IF mixing down-conversion module 70 provides the inbound low IF signal or baseband signal to the filtering/gain module 68. The filtering/attenuation module 68 may be implemented in accordance with the teachings of the present invention to filter and/or attenuate the inbound low IF signal or the inbound baseband signal to produce a filtered inbound signal, effectively selecting one of the channels of the RF broadband signal.

The ADC 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 7 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processor module 50 of the host device and the digital receiver and transmitter processing modules 64 and 76, respectively, may be a common processing device implemented on a single integrated circuit. Further, memory 52 and memory 75 may be implemented on a single integrated circuit and/or on the same integrated circuit as the common processing modules of processor module 50 and the digital receiver processing module 64 and digital transmitter processing module 76.

In one embodiment, the ADC 66 of the invention converts data that has been formatted as FSK modulated data into binary digital data. The ADC 66 typically employs some form of frequency discriminator (not shown) that can identify at which of the two frequencies the carrier signal is oscillating. The discriminator provides an output that is analog in nature and the magnitude of which is proportional to the frequency levels of the received signal. This is essentially a frequency to voltage conversion. Those of average skill in the art will recognize that there are numerous known techniques for providing a frequency-to-voltage conversion function, and the present invention is not intended to be limited to any such implementation.

It would be desirable that all transceivers in a system modulate their respective outbound traffic at precisely the same carrier frequency. Because the carrier frequency can vary by nearly 100% in some applications, such as Bluetooth, however, any offset in the carrier frequency will be represented as a DC offset voltage in the analog signal generated by the voltage-to-frequency conversion. Thus, in making the final conversion between the analog voltage signal and the digital output, the ADC 66 must be able to find the appropriate decision or slicing point by which to determine whether a particular voltage level in the analog signal represents a binary zero or one state. Because the frequency can fluctuate over time, so can the offset. Thus, the decision point must be found dynamically.

Moreover, as previously discussed, selecting a decay rate for peak and valley detectors used to find that slicing point presents a tradeoff between speed of acquisition of packet data and the noise (Bit Error Rate) problem created by long strings of bits having the same binary polarity. Finding a compromise on decay rate may work for some systems, but standards such as Bluetooth have such short preambles and are at such comparatively high data rates that they cannot permit their decay rates to be slowed down during the acquisition process, or packets will be missed.

Figure 8:
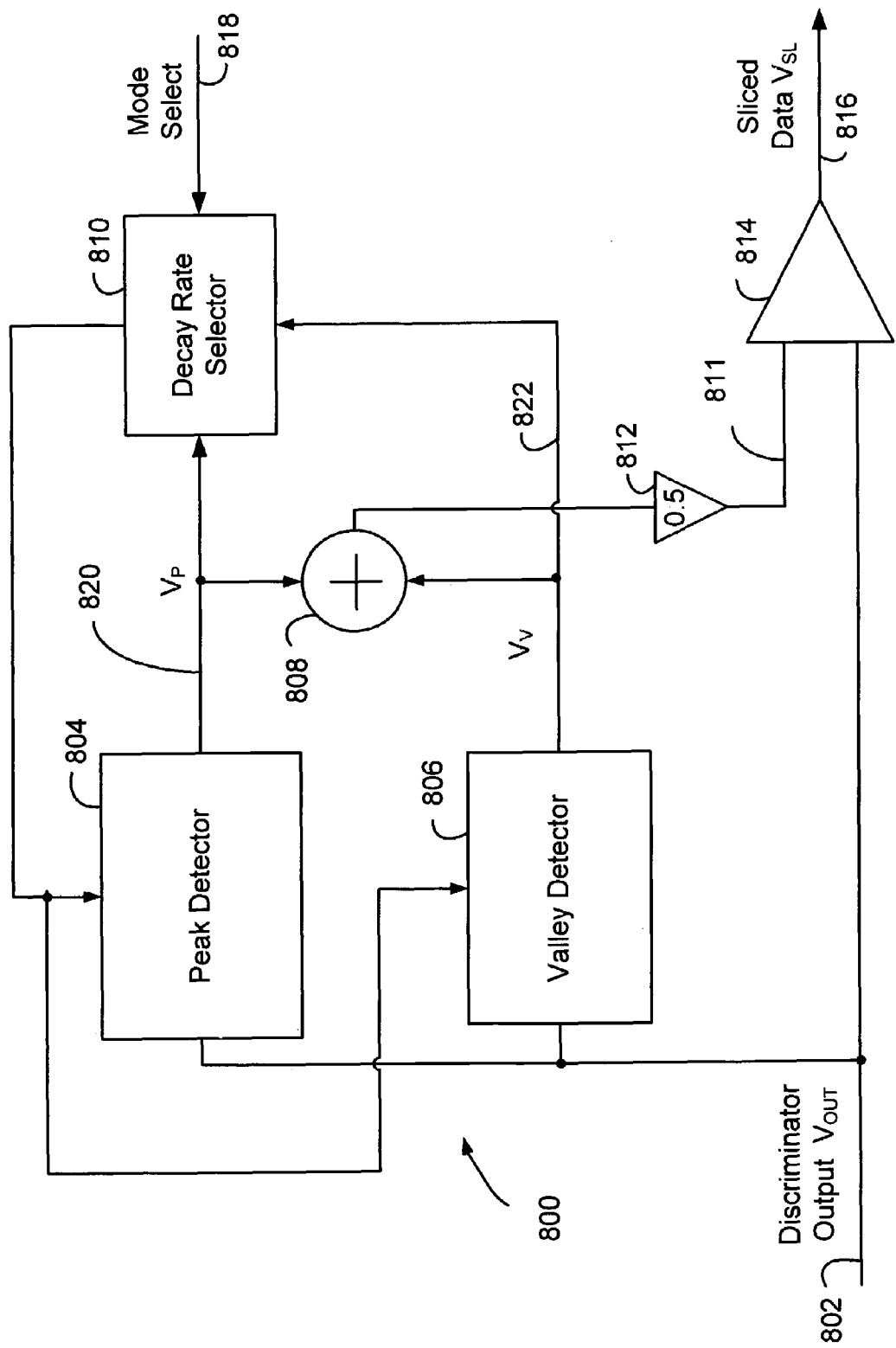
FIG. 8 is a schematic block diagram illustrating an FSK demodulator/slicer of the invention.

Thus, in an embodiment of a slicer circuit 800 of the invention shown in FIG. 8, a decay rate selector 810 is employed that provides for a fast decay rate for a peak detector 804 and a valley detector 806 ensuring the detection of packets notwithstanding large offsets in the output from the discriminator (not shown), as well as a slow decay rate when large numbers of bits of the same polarity causes the difference between the two output voltages to fall below a certain minimum magnitude.

Therefore, in accordance with an embodiment of the invention, the slicer employs the peak detector 804 and the valley detector 806. The invention may be implemented with any peak or valley detector circuit. For example, a simple detector could be made up of a charging capacitor coupled to a current source as a discharge path. The magnitude of the current source would then control the rate at which the voltage across the capacitor is discharged. Multiple decay rates can then be provided by either switching current sources into and out of the discharge path having different magnitudes, or by employing a single current source, the magnitude of which can be controlled to produce greater and lesser magnitudes, and therefore decay rates. Only when a voltage is applied across the capacitor that exceeds the magnitude of the voltage currently stored across the capacitor will the capacitor voltage increase.

The discriminator output 802 resulting from the voltage-to-frequency conversion by the discriminator of ADC 66 is provided to both peak detector 804 and valley detector 806. The detectors 804 and 806 operate to detect the most recent peak and valley voltages ($V_P$ 820 and $V_V$ 822, respectively) as previously described. If they are not being charged up by output 802, then they are discharging at a rate that is dictated by the decay rate selector 810. Once again, the invention is intended to be independent of the implementation of its components, such as the peak detectors. As previously discussed, one of average skill in the art will recognize that there are numerous known techniques for implementing the multiple decay rates for the detectors, such as providing for two current sources having two different magnitudes that are switched, or a single current source, the magnitude of which can be controlled.

The current values of $V_P$ 820 and $V_V$ 822 are summed together at a summing node 808 and then scaled in half by a scaling amplifier 812. This yields a voltage 811 that is halfway between the two values. This voltage 811 is then used as a slicing or decision point for a comparator 814. Whenever the magnitude of discriminator output 802 exceeds the magnitude of the voltage 811, a first digital or binary state results as an output 816 of comparator 814. Whenever the magnitude of output 802 falls below the magnitude of the voltage 811, a second digital or binary state results as an output 816 of comparator 814. Accordingly, a digital bit bit stream, as represented by a specified voltage, is produced.

The two detector voltages $V_P$ 820 and $V_V$ 822 are also provided as inputs to the decay rate selector 810. The decay rate selector 810 monitors the difference between $V_P$ 820 and $V_V$ 822. If ($V_P-V_V$) exceeds some percentage (e.g., 75%) of the expected difference (i.e., ($V_P-V_V$)<0.75(2$V_A$), then there may be an offset present and the decay rate selector 810 chooses a "fast decay" mode to aid in acquisition in the presence of an offset. If ($V_P-V_V$)<0.75(2$V_A$), then the decay rate selector 810 chooses a "slow decay" mode to aid in ensuring that the ($V_P-V_V$) does not fall below some minimal level, compromising the noise margin for comparator 814.

A mode select input 818 may be provided to enable or disable the "select" or "fast decay" mode. For example, it may be that a particular system may have very long strings of bits having the same polarity. In this case, it may be advantageous for the system to disable fast decay mode once it knows that a packet has already been acquired, giving the slicer the opportunity to extend its ability to handle even longer strings of the same polarity bits because it would always be in slow mode. Then, once the packet has been completely demodulated, the system could then put itself back into the selection mode for purposes of acquiring the next packet.

Figure 9:
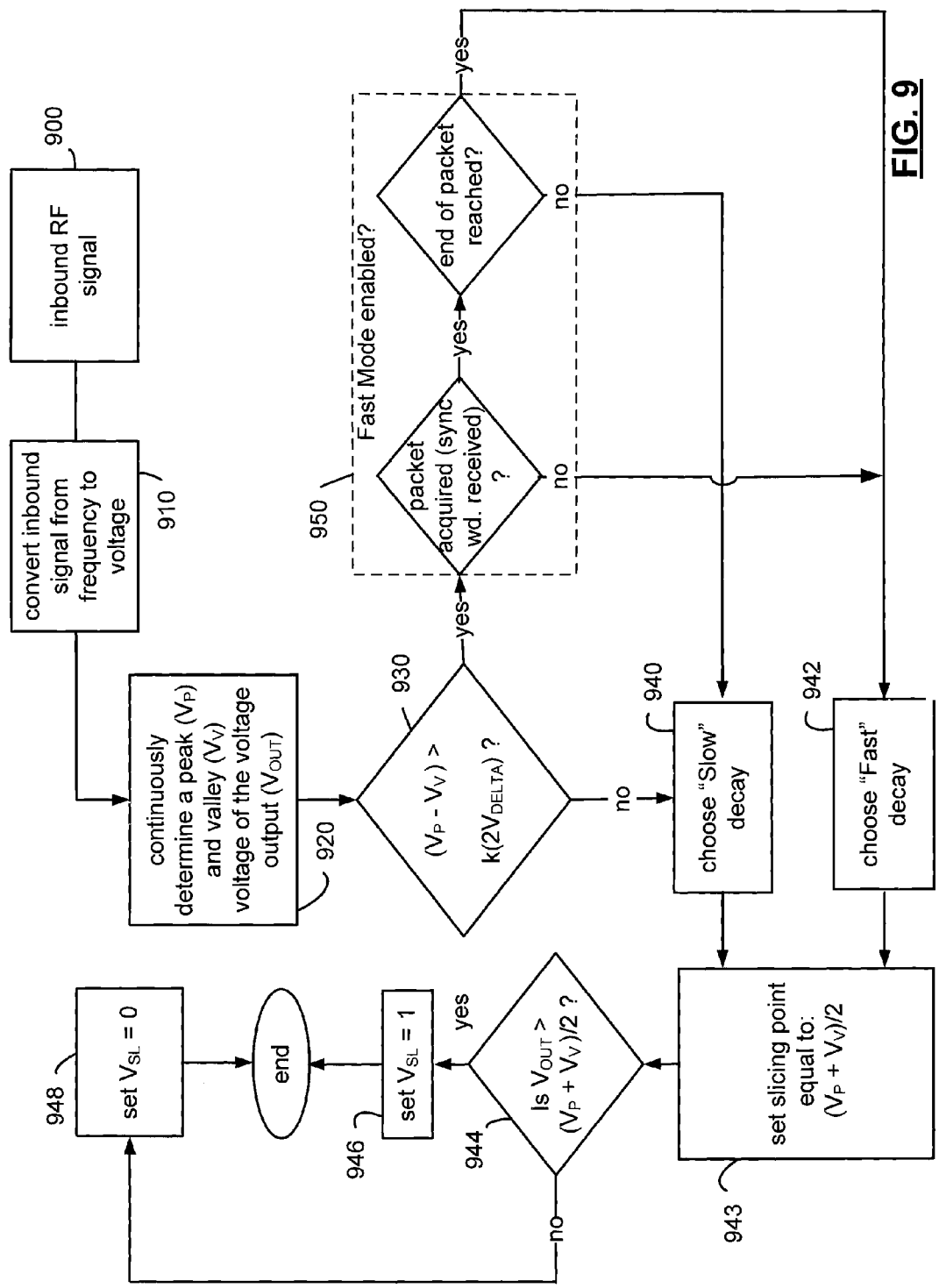
FIG. 9 is a flowchart illustrating an embodiment of the invention.

FIG. 9 is a flowchart illustrating an embodiment of the method of the invention. Processing begins at 900 where an inbound RF signal is received having an FSK modulated format. At 910, the received inbound RF signal is converted from a frequency signal to a voltage signal. At 920, peak and valley voltages are continuously captured. At 930, a determination is made as to whether the difference between the current peak and valley voltages is greater than some percentage of the expected $V_{OUT}$ output swing. Through empirical data, it has been determined that k=0.75 provides very reliable performance, but those of average skill in the art will recognize that other values of k may function as well. If the answer to the question at 930 is 'yes', flow continues at 950, where it is determined whether "Fast" decay mode is enabled. If the answer is 'yes', then "Fast" decay is selected at 942 and both the current peak and valley voltages are drained at a significantly faster rate.

If the answer at 930 is 'no', or the answer at 950 is 'no', then slow decay is chosen at 940. The slicing point is then determined in step 943 to be the sum of the peak and valley voltages divided by 2. From there, it is determined whether $V_{OUT}$ is greater than or less than the slicing point voltage in step 944. If greater, $V_{SL}$ is set equal to a binary one in step 946, and if less, then $V_{SL}$ is set equal to a binary zero in step 948. It should be noted that as part of this flow, one could control the mode enable process based upon whether a packet has been verified, or whether an end-of-packet has been received. For example, once it has been determined that a packet has been acquired and a synch word has been received, the fast mode should not be required and therefore could be disabled until the end of the packet is reached, at which time it could be re-enabled.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives failing within the spirit and scope of the present invention as defined by the claims.

What is claimed is:

1. A method of determining an optimal slicing point for demodulating a received FSK modulated signal, said method comprising:

determining continuously a current peak voltage and a current valley voltage of a voltage signal the magnitude of which is related to the frequency of the received FSK modulated signal, wherein the magnitude of the current peak and valley voltages decrease at one of at least two decay rates whenever the magnitude of the voltage signal is less than the magnitude of the current peak or valley voltage;

when a packet has not been detected, selecting a fast one of the at least two decay rates whenever the difference between the current peak and current valley voltages exceeds some percentage of an expected difference, and otherwise selecting a slow one of the at least two decay rates, wherein the fast decay rate is significantly faster than the slow decay rate;

determining that a packet has been acquired and an end of packet has not been reached; and selecting the slow one of the at least two decay rates based upon a received mode control signal and upon subsequently enabling selection of the fast one of the at least two decay rates once an end of packet has been detected wherein a slow decay is selected when a packet has been acquired as determined when the synch word has been received and an end of packet has not been reached and selecting a fast decay mode when the packet is not acquired or when it has been acquired and an end of packet is reached; and setting the optimal slicing point to a magnitude that is about half of the sum of the current peak and valley voltages.

2. The method of claim 1 wherein the fast decay rate is sufficient to achieve an operable slicing point within four bits or less of the onset of a packet preamble.

3. The method of claim 1 wherein the slow decay rate is sufficient to maintain an operable slicing point for a minimum number of sequential bits of the same polarity.

4. A method of demodulating a received FSK modulated RF signal, said method comprising:

converting the received FSK modulated RF signal to a voltage signal, the voltage signal having a magnitude that is related to a frequency of the received FSK modulated RF signal;

establishing continuously a slicing point for the voltage signal, said establishing further comprising;

determining continuously a current peak voltage and a current valley voltage of the voltage signal, wherein the magnitude of the current peak and valley voltages decrease at one of at least two decay rates whenever the magnitude of the voltage signal is less than the magnitude of the current peak or valley voltage;

when a packet has not been detected:

selecting a fast one of the decay rates whenever a mode select signal is received supporting a fast decay rate or whenever the difference between the magnitudes of the current peak and current valley voltages exceeds some percentage of an expected difference, and otherwise selecting a slow one of the at least two decay rates, wherein the fast decay rate is significantly faster than the slow decay rate; and when a packet has been detected:

selecting the slow one of the at least two decay rates whenever a mode select signal is received supporting a slow decay rate and subsequently enabling selection of the fast one of the at least two decay rates once an end of packet has been detected;

setting the slicing point to a voltage magnitude that is about half of the sum of the magnitudes of the current peak and valley voltages; and generating a digital output that is a binary one when the magnitude of the voltage signal is greater than the slicing point, and that is a binary zero when the magnitude of the voltage signal is less than the slicing point.

5. The method of claim 4 wherein the received FSK modulated RF signal comprises one or more Bluetooth packets.

6. The method of claim 4 wherein said selecting further comprises disabling the selection of the fast decay rate when a packet has been detected.

7. The method of claim 4 wherein said selecting further comprises enabling the selection of the fast decay mode when an end of a packet has been detected.

8. An apparatus for determining an optimal slicing point for demodulating a received FSK modulated RF signal, said apparatus comprising:

a peak detector having an input coupled to a voltage signal, the magnitude of which is directly related to the frequency of the received FSK modulated RF signal, the peak detector producing an output that continuously reflects the magnitude of the most recent peak voltage of the voltage signal, the peak detector further comprising a path through which the peak voltage on the peak detector output is permitted to discharge at one of at least two decay rates;

a valley detector having an input coupled to the voltage signal, the magnitude of which is directly related to the frequency of the received FSK modulated RF signal, the valley detector producing an output that continuously reflects the magnitude of the most recent valley voltage of the voltage signal, the valley detector further comprising a path through which the peak negative-going signal on the valley detector output is permitted to discharge at one of the at least two decay rates;

a decay rate selector coupled to the peak and valley detector outputs, the decay rate selector generating an output coupled to the peak and valley detectors by which a faster one of the at least two decay rates for the peak and valley detector outputs is selected when a packet has not been detected and, when a packet has been detected, a slower of the at least two decay rates is selected and when a mode select signal has been received supporting a fast decay mode;

a summing device for adding the magnitude of the peak and valley detector output signals; and a scaling device coupled to the summing device for receiving the sum of the magnitudes, the scaling device producing an output that reduces the sum of the magnitudes by about 50%, the output of the scaling device being the slicing point.

9. The apparatus of claim 8 wherein the decay rate selector further comprises a circuit that continuously determines whether the difference between the current magnitudes of the peak and valley voltages, scaled by a predetermined factor, exceeds an expected difference.

10. The apparatus of claim 9 wherein a decay rate selector output selects a fast one of the at least two decay rates whenever a fast decay mode is enabled, and the difference between the current magnitudes of the peak and valley voltages, scaled by a predetermined factor, exceeds the expected difference.

11. The apparatus of claim 10 wherein the decay rate selector output selects a slow one of the at least two decay rates whenever the fast decay rate is disabled or the difference between the current magnitudes of the peak and valley voltages, scaled by a predetermined factor, is less than the expected difference.

12. The apparatus of claim 11 wherein the fast decay rate is disabled when a packet is acquired and detected, and is enabled when an end of packet is detected.

13. An apparatus for demodulating a received FSK modulated RF signal, said apparatus comprising:

a discriminator having an input coupled to the received FSK modulated RF signal, the discriminator producing a voltage signal, the magnitude of which is directly related to the frequency of the received signal;

a peak detector having an input coupled to the voltage signal, said peak detector producing an output that continuously reflects the magnitude of the most recent peak voltage of the voltage signal, the peak detector further comprising a path though which the peak voltage on the peak detector output is permitted to discharge at one of at least two decay rates;

a valley detector having an input coupled to the voltage signal, said valley detector producing an output that continuously reflects the magnitude of the most recent peak negative-going signal of the voltage signal, and a path through which the valley voltage on the valley detector output is permitted to discharge at one of the at least two decay rates;

a decay rate selector coupled to the peak and valley detector outputs, the decay rate selector generating an output coupled to the peak and valley detectors by which a fast one of the at least two decay rates is selected for the peak and valley detector outputs when a packet has not been detected and, when a packet has been detected, a slower of the at least two decay rates is selected when a mode select signal has been received supporting the slower of the at least two decay rates;

a summing device for adding the magnitude of the peak and valley detector output voltages;

a scaling device coupled to the summing device for receiving the sum of the magnitudes, the scaling device producing an output that reduces the sum of the magnitudes by about 50%, the output of the scaling device being a slicing point; and a comparator having a first input for receiving the slicing point and a second input for receiving the voltage signal, the comparator generating a digital output that is a binary one when the magnitude of the voltage signal is greater than the slicing point, and is a binary zero when the magnitude of the voltage signal is less than the slicing point.

14. The apparatus of claim 13 wherein the received signal comprises one or more Bluetooth packets.

15. An apparatus for determining an optimal slicing point for demodulating a received FSK modulated RF signal, said apparatus comprising:

means for determining continuously a current peak voltage and a current valley voltage of a voltage signal, the magnitude of which is directly related to the frequency of the received FSK modulated RF signal, wherein the magnitude of the current peak and valley voltages decrease at one of at least two decay rates whenever the magnitude of the voltage signal is less than the current peak or valley voltage;

means for selecting a fast one of the at least two decay rates based upon a received mode select signal whenever the difference between the current peak and current valley voltages exceeds some percentage of an expected difference and when a packet has not been detected, and when a packet has been detected, selecting a slow one of the at least two decay rates; and means for setting the slicing point to a magnitude that is about half of the sum of the current peak and valley voltages.

16. An apparatus for demodulating a received FSK modulated RF signal, said apparatus comprising:

means for converting the received FSK modulated RF signal to a voltage signal, the voltage signal having a magnitude that is related to the frequency of the received FSK modulated RF signal;

means for establishing continuously a slicing point for the voltage signal, said establishing further comprising:

means for determining continuously a current peak voltage and a current valley voltage of the voltage signal, wherein the magnitude of the current peak and valley voltages decrease at one of at least two decay rates whenever the magnitude of the voltage signal is less than the magnitude of the current peak or valley voltage;

means for selecting a fast one of the decay modes whenever the difference between the magnitudes of the current peak and current valley voltages exceeds some percentage of an expected difference and when a packet has not been detected, and selecting a slow one of the at least two decay rates when a packet is detected and based upon a received mode select signal that supports selecting the slow one; and means for setting the slicing point to a voltage magnitude that is about half of the sum of the current peak and valley voltage magnitudes; and means for generating a digital output that is a binary one when the magnitude of the voltage signal is greater than the slicing point, and is a binary zero when the magnitude of the voltage signal is less than the slicing point.

17. A Radio Frequency (RF) receiver of a wireless device comprising an amplifier for amplifying a received FSK modulated RF signal, the amplifier coupled to a down-converter for converting the received FSK modulated RF signal to a down-converted IF or baseband frequency, the RF receiver further comprising:

demodulating means, coupled to the down-converter, for recovering digital data from the down-converted FSK modulated RF signal; said demodulating means further comprising:

means for converting the received FSK modulated RF signal to a voltage signal, the voltage signal having a magnitude that is related to the frequency of the received FSK modulated RF signal;

means for establishing continuously a slicing point for the voltage signal, said establishing further comprising:

means for determining continuously a current peak voltage and a current valley voltage of the voltage signal, wherein the magnitude of the current peak and valley voltages decrease at one of at least two decay rates whenever the magnitude of the voltage signal is less than the magnitude of the current peak or valley voltage;

means for selecting a fast one of the at least two decay rates based in part upon a received mode select signal whenever the difference between the magnitudes of the current peak and current valley voltages exceeds some percentage of an expected difference, and otherwise selecting a slow one of the at least two decay rates, said means selecting based in part upon whether a packet has been detected; and means for setting the slice point to a voltage magnitude that is about half of the sum of the current peak and valley voltage magnitudes; and means for generating a digital output that is a binary one when the magnitude of the voltage signal is greater than the slicing point, and is a binary zero when the magnitude of the voltage signal is less than the slicing point.

18. A Radio Frequency (RF) receiver of a wireless device comprising an amplifier for amplifying a received FSK modulated RF signal, the amplifier coupled to a down-converter for convening the received FSK modulated RF signal to a down-convened IF or baseband frequency, the RF receiver further comprising:

an FSK demodulator coupled to the down-convener to receive the down-converted FSK modulated RF signal, said FSK demodulator comprising:

a discriminator having an input coupled to the received FSK modulated RF signal, the discriminator producing a voltage signal, the magnitude of which is directly related to the frequency of the received signal; and a data slicer coupled to the discriminator to receive the voltage signal, the data slicer producing a voltage output that represents a slicing point, the data slicer further comprising:

a peak detector having an input coupled to the voltage signal, said peak detector producing an output that continuously reflects the magnitude of the most recent peak voltage of the voltage signal, and a path through which the peak voltage on the peak detector output is permitted to discharge at one of the at least two decay rates;

a valley detector having an input coupled to the voltage signal, said valley detector producing an output that continuously reflects the magnitude of the most recent valley voltage of the voltage signal, and a path through which the peak negative voltage on the valley detector output is permitted to discharge at one of the at least two decay rates;

a decay rate selector coupled to the peak and valley detector outputs, the decay rate selector generating an output coupled to the peak and valley detectors by which a fast and slow one of the at least two decay rates is selected for the peak and valley detector outputs, said decay rate selector selecting based in part upon whether a packet has been detected as determined by a received mode select signal and based in part upon a comparison of a difference of an average value of the peak and valley detector outputs in relation to a threshold;

a summing device for adding the magnitude of the peak and valley detector output voltages;

a scaling device coupled to the summing device for receiving the sum of the magnitudes, the scaling device producing an output that reduces the sum of the magnitudes by about 50%, the output of the scaling device being a slicing point; and a comparator having a first input for receiving the slicing point and a second input for receiving the voltage signal, the comparator generating a digital output that is a binary one when the magnitude of the voltage signal is greater than the slicing point, and is a binary zero when the magnitude of the voltage signal is less tan the slicing point.

19. The Radio Frequency (RF) receiver of claim 18 wherein the decay rate selector further comprises a circuit that continuously determines whether the difference between the current magnitudes of the peak and valley voltages, scaled by a predetermined factor, exceeds an expected difference.

20. The Radio Frequency (RF) receiver of claim 19 wherein a decay rate selector output selects a fast one of the at least two decay rates whenever a fast decay mode is enabled, and the difference between the current magnitudes of the peak and valley voltages, scaled by a predetermined factor, exceeds the expected difference.

21. The Radio Frequency (RF) receiver of claim 20 wherein the decay rate selector output selects a slow one of the at least two decay rates whenever the fast decay rate is disabled or the difference between the current magnitudes of the peak and valley voltages, scaled by a predetermined factor, is less than the expected difference.

22. The Radio Frequency (RF) receiver of claim 21 wherein the fast decay rate is disabled when a packet is acquired and detected, end is enabled when an end of the packet is detected.

* * * * *